United States Patent [19]

Redden

[11] Patent Number: 5,678,606
[45] Date of Patent: Oct. 21, 1997

[54] WATER COLLECTION AND DISTRIBUTION BOX AND METHOD RELATED THERETO

[76] Inventor: Edsel E. Redden, P.O. Box 514, Daniels, W. Va. 25832

[21] Appl. No.: 672,742

[22] Filed: Jun. 28, 1996

[51] Int. Cl.⁶ .................................................. F16K 3/32
[52] U.S. Cl. .............................. 137/883; 251/95; 251/114
[58] Field of Search ............................. 137/883; 251/95, 251/114

[56] References Cited

U.S. PATENT DOCUMENTS

| | | | |
|---|---|---|---|
| 3,333,814 | 8/1967 | Sargent | 251/114 X |
| 3,956,137 | 5/1976 | Demprey | 137/883 X |

*Primary Examiner*—John Fox
*Attorney, Agent, or Firm*—Spencer D. Conard

[57] ABSTRACT

A water collection and distribution unit is provided for collecting a water stream and dividing the stream into a discharge stream and an outlet stream. The outlet stream has a predetermined desired flow rate. The unit has a box for receiving water, and the box has a discharge port and an outlet port. The unit has a self-locking gate for controlling the rate of discharge through the outlet port. The self-locking gate has a pair of spaced apart vertical tracks for receiving a plate which is vertically moveable within the tracks. A locking element is pivotally attached to the plate and has a finger which is received within a track for locking the plate into a position relative to the track. The track has a series of holes for receiving the finger at any of a plurality of vertical positions. A stop element limits the movement of the locking element to facilitate the locking function. The locking element may be rotated to a non-locking position to permit lowering of the plate. The discharge port may have a locking valve similar to the locking gate associated therewith for restricting the flow of water therethrough.

6 Claims, 3 Drawing Sheets

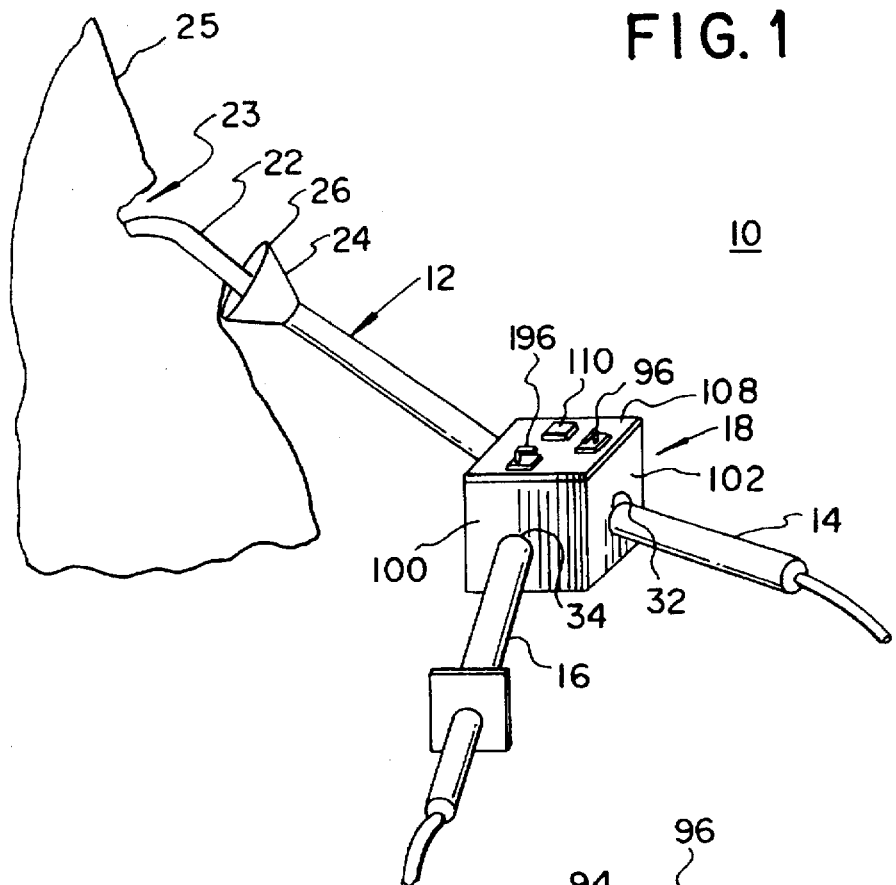
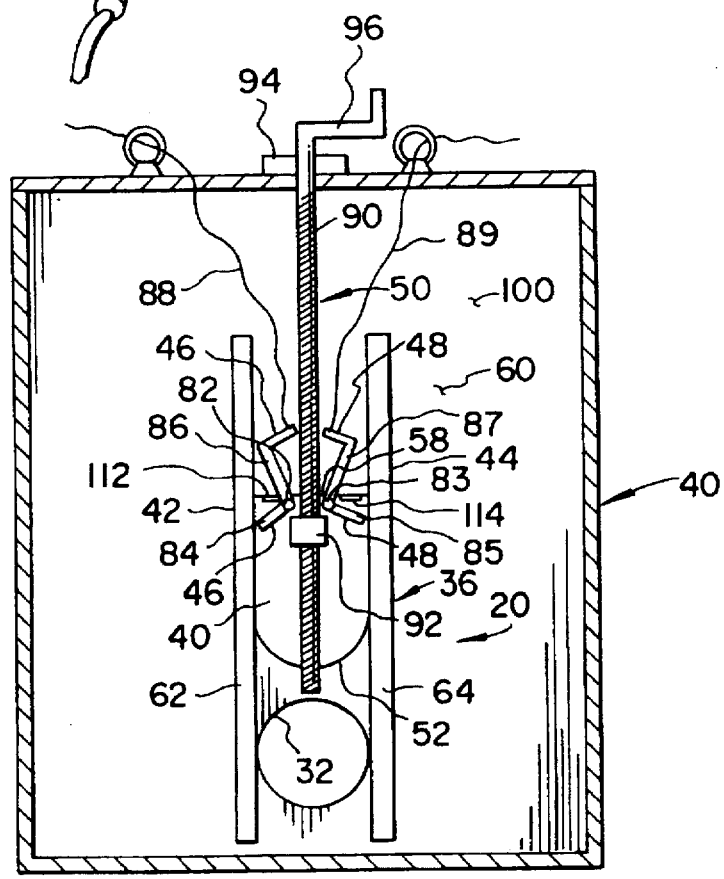

WATER COLLECTION AND DISTRIBUTION BOX AND METHOD RELATED THERETO

BACKGROUND OF THE INVENTION

1. Field of the Invention

The present invention relates to water distribution systems, and more particularly relates to water distribution systems for water streams and related methods.

2. Description of the Related Art

Various flow control systems exist for controlling natural water flow rates. For example, diversionary dams and canals have been used in the past to control the flows of water from natural streams to facilitate irrigation or other uses of the water. Such control systems have at at times either been difficult to control or have been subject to the level of water flowing in the stream.

Consequently, there is a need and a desire for a water control system for streams that provides a desired level of control and adjustability and continuity of flow rate.

SUMMARY OF THE INVENTION

A water collection and distribution unit is provided for the division of a water stream into a controlled flow stream and a discharge stream. The unit has (a) a container (box), (b) a discharge pipe, (c) an outlet pipe and (d) a self-locking sliding gate/valve for controlling the level of flow through the outlet pipe. The unit preferably further includes a second self-locking sliding gate/valve for controlling the level flow through the discharge pipe. The unit effectively divides the intake stream into a useful controlled flow outlet stream and a discharge stream.

BRIEF DESCRIPTION OF THE DRAWINGS

FIG. 1 is a perspective view of a water collection and distribution unit in use according to the present invention, FIG. 2 is a side elevational cross-sectional view of the box of the unit showing the sliding gate valve for the discharge pipe of the unit according to FIG. 1.

DETAILED DESCRIPTION OF THE INVENTION

Figure 3:
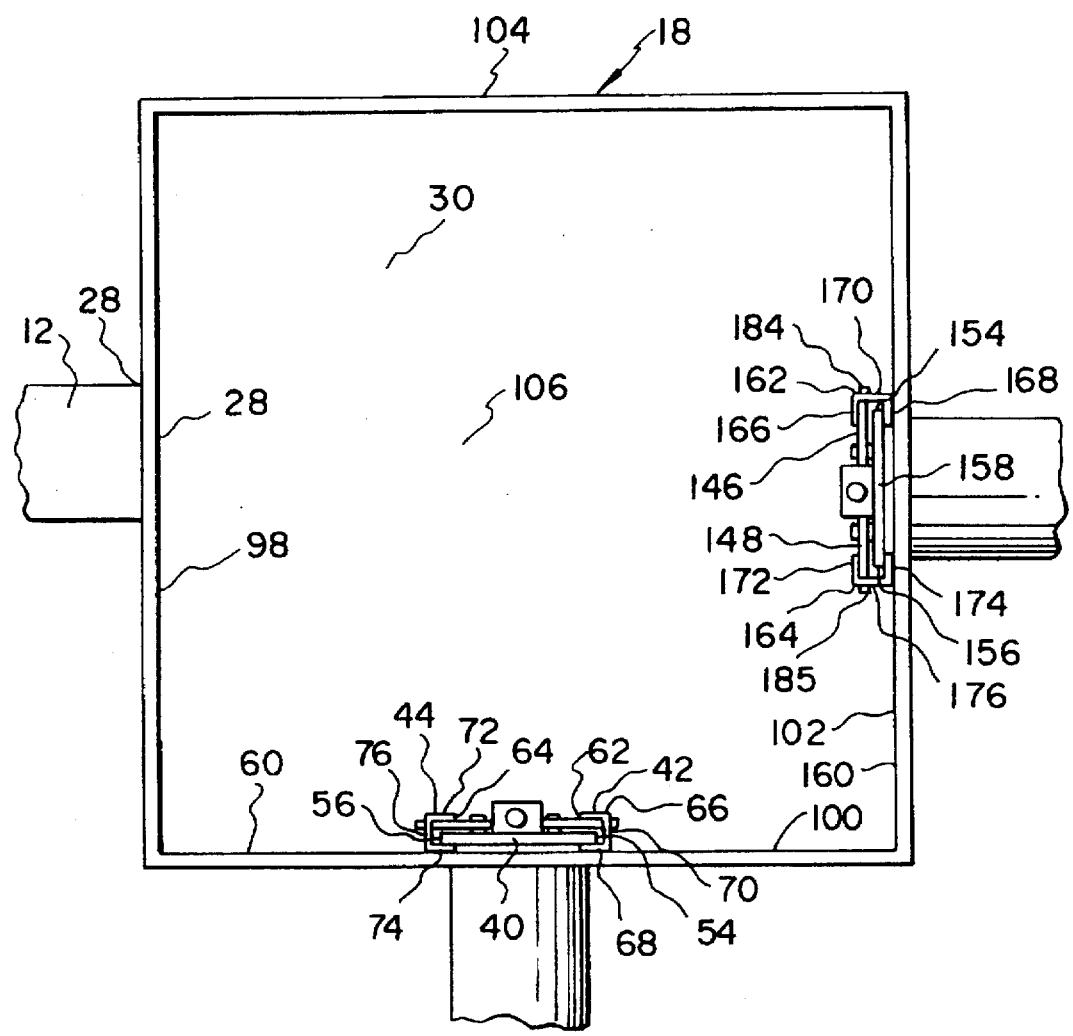
FIG. 3 is a top elevational plan cross-sectional cutaway view of the unit of FIG. 1 according to the present invention.
Figure 4:
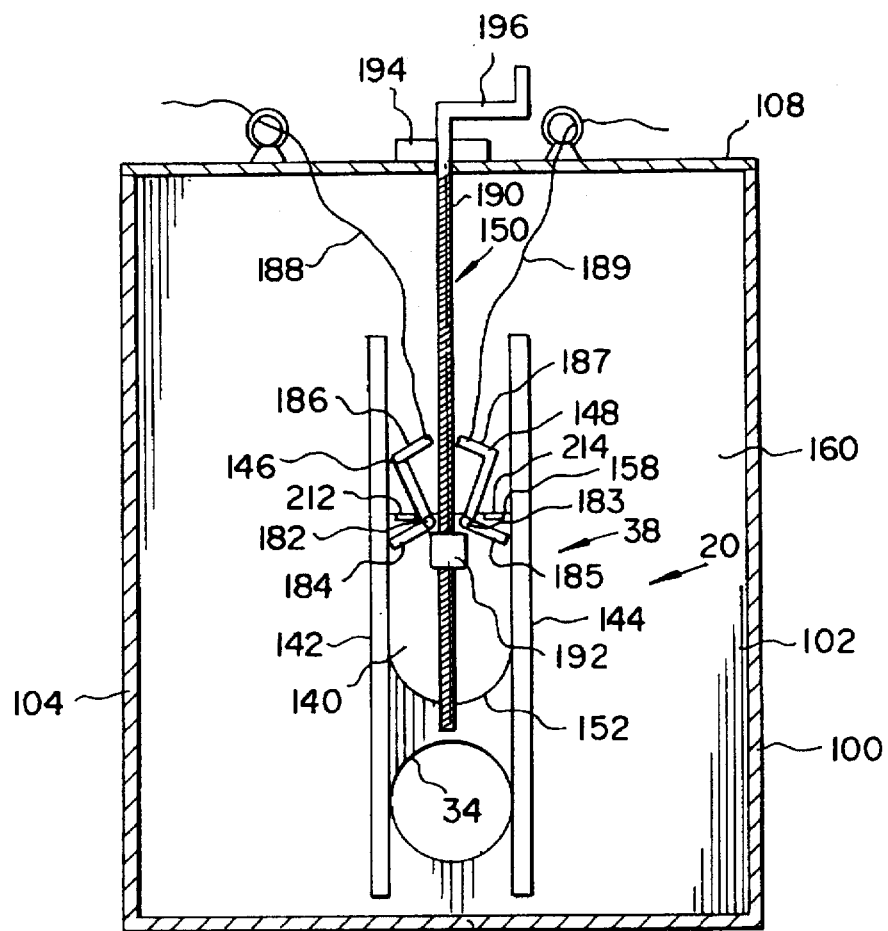
FIG. 4 is a side elevational cross-sectional view of the box of the unit showing the sliding gate valve for the outlet flow pipe of the unit according to FIG. 1.

As shown in FIGS. 1, 2, 3 and 4 a water collection and distribution unit (10) comprises an intake pipe (12), a discharge pipe (14), an outlet pipe (16), a collection (container) box (18), and means (20) for controlling the rates of flow through the discharge pipe (14) and outlet pipe (16). In operation, a natural or man made (intake) stream (22), such as an effluent stream from a coal mine (abandoned coal mine) (23) located in an upper elevation of a mountain (hill) (25), is captured by the intake pipe (12) having an inlet (optionally enlarged such as a funnel) mouth (24) at its upstream end (26) which directs the inflowing water of the stream (22) through an inlet orifice (28) of box (18) and into interior (30) of box (18). The inflowing water is received by box (18) and accumulates therein until it rises to the level of the discharge pipe (14) and/or the outlet pipe (16). Box (18) has a discharge port (32) for permitting water to flow from the box (18) into the discharge pipe (14) and has an outlet port (34) for permitting water to flow from the box (18) into the outlet pipe (16).

The flow of water through the discharge port (32) into the discharge pipe (14) may be controlled by a self-locking slide valve (36), and the flow of water through the outlet port (34) is controlled by a self-locking slide gate (38). The valve (36) and gate (38) serve as means for controlling the flow of water from the box through the discharge pipe (14) and outlet pipe (16).

The self-locking slide valve (36) preferably comprises (a) a closure plate (40), (b) a pair of spaced apart rachet tracks (42, 44), (c) a pair of locking elements (46, 48) and (d) a drive screw system (50). The closure plate (40) is preferably a metal plate, such as a steel plate, and is preferable in the shape of having a downwardly extending arcuate bottom edge (52), a pair of spaced apart vertical straight side edges (54,56) and a horizontal straight top edge (58).

The pair of spaced apart rachet tracks (42, 44) are in the form of U-shaped channels (62, 64) which extend vertically within the box (18) and are attached to an interior side (60) of a side wall (100) having the discharge port (32) located therebetween. In other words, track (42) is located on one side of discharge port (34) and the other track (44) is located on the other side of outlet port (34). As best shown in FIG. 3, the channels (62, 64)respectively of the tracks (42, 44) open toward each other for receiving the respective side edges (54, 56) of the plate (40). In other words, the channel (62) of track (42) receives edge (54), and the channel (64) of track (44) receives edge (56), and this arrangement allows plate (40) to move vertically within the channels (62, 64).

Figure 5:
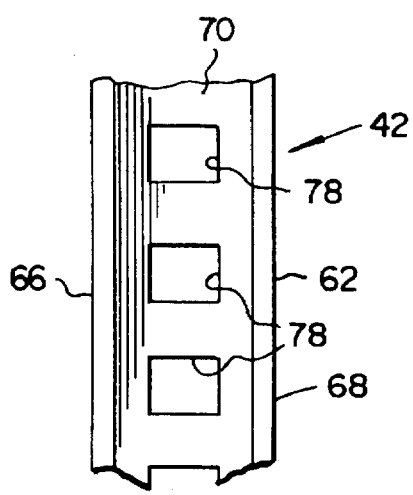
FIG. 5 is a side elevational cutaway view of a track of the unit of FIG. 1.
Figure 6:
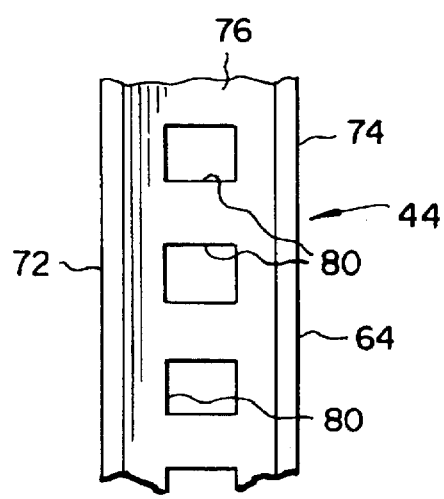
FIG. 6 is a side elevational cutaway view of a track of the unit of FIG. 1.

As best shown in FIG. 5, the U-shaped channel (62) has a pair of spaced apart side walls (66, 68) and an end wall(70) extending between the side walls (66, 68). As best shown in FIG. 6, the U-shaped channel (64) has a pair of spaced apart sidewalls (72, 74) and an end wall (76) extending between the side walls (72, 74). The end walls (70, 76) each have a series (plurality) of rachet holes (78, 80 respectively). The valve (36) further includes at least one locking element (46) (preferably a pair of locking elements (46, 48)) which preferably is connected to the plate (40) by pivot pin (82) for rotation about a horizontal axis formed by the pin (82) and transverse to the plane formed by plate (40). The locking element (46)has a locking finger (84) and a locking arm (86) fixed to the locking finger (84), and the pin (82) is located at the point of interconnection of the finger (84) and the pin (86). The arms (86) are each preferably in the shape of an L. The arm (86) is preferably attached to a chain (88) for remote leverage of the element (46) about the pin (82). The other locking element (48) also has a locking finger (85) and a locking arm (87) fixed to the locking finger (85), and a pivot pin (83) is located at the point of interconnection of the finger (85) and the pin (83). The arm (87) is preferably in the shape of an L. The arm (87) is preferably attached to a chain (89) for remote leverage of the element (48) about the pin (83).

The screw system (50) comprises (a) an elongated vertical threaded screw shaft (90), (b) a threaded collar (92), (c) a smooth collar (94) and (d) a crank handle (96). The threaded collar (92) is fixedly attached to the plate(40) and threadably receives the shaft (90). The box (18) preferably comprises four side walls (98, 100, 102, 104) forming a rectangle in top plan view, a floor (106) and a ceiling (108) having an access lid (110). The smooth collar (94) is fixedly attached to the box at an upper location above the plate (40), for example being attached to the ceiling (108) or to the top of the wall containing the port to be covered by the plate. The handle (96) is fixedly attached to the top of the shaft(90) for manual rotation of the shaft (90).

In operation, manual (or motorized) rotation of the handle (96) and consequently the manual or motorized rotation of the shaft (90) leads to movement of the threaded collar (92) along the shaft resulting in vertical movement of the plate (40) within the tracks (42, 44). Lifting of the chains (88, 89) causes rotation of the elements (46, 48)to a position where the fingers(84, 85) of the elements (46, 48 respectively do not engage the tracks (42, 44) thereby allowing the plate (40) to move either upward or downward within the tracks (42, 44). Release of the chains (88, 89) allows the fingers (84,85) to engage the respective tracks (42, 44) and to become locked therein by the fingers (84, 85) entering the holes (78, 80), and the element (46, 48) abutting a stop post (112, 114 respectively) which restricts the rotation of the element (46, 48 respectively)preventing downward movement of the plate. Upward movement of the plate (40) may be achieved without pulling of the chains. The gate (38) preferably has identical components and preferably operates in an identical manner. The gate (38) has a plate (140), a pair of spaced apart tracks (142, 144), a pair of locking elements (146, 148),and a screw drive system (150). The plate (140) of gate (38) has a downwardly arcuate bottom edge (152), a pair of spaced apart vertical straight side edges (154, 156) and a horizontal straight top edge (158). The gate (38) is attached to the interior (160) of side wall (102) so that the discharge port (32) is located between the tracks (142, 144) and the plate (140) when moving vertically within the tracks (142, 144) can move from a lower position closing the discharge port (32) to higher positions opening the discharge port (32). The locking elements (146, 148) respectively include fingers (184, 185) interconnected (integral) with arms (186, 187) and are pivotally attached to plate (140) by pins (182, 183 respectively) for pivotal rotation about the horizontal axis (transverse to the plate (140)) formed by the pins (182, 183). The tracks (142, 144) are U-shaped in cross-section having respective channels (162, 164). Channel (162) of track (144) has a pair of spaced apart sidewalls (166, 168) and an end wall (170) extending between the side walls (166, 168). The end wall (170) has a series of rachet holes (not shown) for receiving a finger (184) for locking engagement with the locking element (146). The channel (164) of track (146) has a pair of spaced apart sidewalls (172, 174) and an end wall (176) extending between the side walls (172, 174). The end wall (176) has a series of rachet holes (not shown) for receiving a finger (185) for locking engagement with the locking element (148). The locking elements (146, 148) have L-shaped arms (186, 187) integral with the respective fingers (184, 185). Each locking element may be swung into disengagement with the respective track by pulling on the respective chain (188,189). The plate (140) may be raised and/or lowered by the screw drive system (150) which includes an elongated vertical screw (190) which may be rotated by handle (196) either manually or mechanically. The system further includes a threaded collar (192) fixedly attached to the plate (140) so that upon rotation of the screw, the plate moves along the length of the screw and vertically within the tracks. The screw (190) is held by a smooth collar (194) which is fixed to the ceiling (108) to permit rotation of the screw (190) and to hold the screw (190) in vertical orientation and position. During operation, rotation of the screw (190) causes the plate to move vertically to either open, partially open, close or partially close the discharge port (34). Once the plate is in the desired position, the locking elements may be permitted to swing into locked positions with the respective fingers entering the respective rachet holes. Stop posts (212, 214) prevent the locking elements (184, 185) from swinging unintentionally out of locked positions.

I claim:

1. A water collection and distribution unit comprising:
   (a) a water collection box having a discharge port and an outlet port,
   (b) a self locking gate for controlling the flow of water through said outlet port, said gate comprising (i) a plate, (ii) a pair of spaced apart tracks for receiving said plate for movement within said tracks, at least one of said tracks comprising a plurality of holes(iii) means for forcibly moving said plate within said tracks, (iv) at least one pivotable locking element having a finger for insertion within a hole of said track, said locking element being pivotally attached to said plate, and said locking element being restricted in a direction of rotation to prevent the plate from unintentionally moving downward when said locking element is in a locked position.

2. The unit of claim 1 wherein said plate has two spaced apart vertical sides and a downwardly arcuate bottom edge.

3. The unit of claim 1 wherein said tracks each have a U-shaped cross-section wherein said U-shapes open inwardly toward said plate for receiving said plate therein.

4. The unit of claim 1 wherein said locking element has a chain attached to said arm for manual rotation of said arm.

5. The unit of claim 1 wherein said unit further comprises an intake pipe for directing water into said box, a discharge pipe for directing water from said discharge port, and an outlet pipe for directing water from said outlet pipe.

6. The unit of claim 1 wherein said unit further comprises a threaded shaft rotatably attached to said box and a threaded collar fixed attached to said plate, said shaft being threadably received by said threaded collar for relative vertical movement of said collar along said shaft upon rotation of said shaft.

* * * * *